United States Patent [19]

Kobashi

[11] 3,786,636

[45] Jan. 22, 1974

[54] HYDRAULIC BRAKE BOOSTER

[75] Inventor: Uichiro Kobashi, Kariya, Japan

[73] Assignee: Aisin Seiki Kabushiki Kaisha, Kariya-shi, Aichi-ken, Japan

[22] Filed: Dec. 17, 1971

[21] Appl. No.: 209,107

[30] Foreign Application Priority Data
Dec. 18, 1970  Japan.............................. 45-114510

[52] U.S. Cl...................... 60/548, 60/552, 91/370, 91/434
[51] Int. Cl. ...... F15b 7/00, F15b 9/00, F15b 13/14
[58] Field of Search... 60/54.5 P, 54.6 P, 52 B, 548, 60/552; 91/370, 371, 372, 373, 434

[56] References Cited
UNITED STATES PATENTS

| | | | |
|---|---|---|---|
| 3,106,874 | 10/1963 | Schultz............................ | 60/54.6 P |
| 3,354,788 | 11/1967 | Garrison et al...................... | 91/373 |
| 3,032,992 | 5/1962 | Schnell............................... | 60/52 B |
| 3,044,265 | 7/1962 | Schwartz et al.................. | 60/54.6 P |
| 3,677,138 | 7/1972 | Goscenski............................ | 91/373 |
| 3,677,002 | 7/1972 | Tulmer.............................. | 60/54.6 P |
| 3,532,027 | 10/1970 | MacDuff............................... | 91/372 |
| 3,133,473 | 5/1964 | Garrison et al..................... | 91/372 |
| 3,633,462 | 1/1972 | Goscenski........................ | 91/391 R |
| 3,625,113 | 12/1971 | Euler................................. | 91/391 R |

*Primary Examiner*—Martin P. Schwadron
*Assistant Examiner*—A. M. Zupcic
*Attorney, Agent, or Firm*—Berman, Bishoff & Platt

[57] ABSTRACT

Disclosed herein is a hydraulic brake booster for a brake system of a vehicle utilizing a hydraulic pressure source for a hydraulic power control system of the vehicle, wherein the booster comprises a casing mounted on the brake master cylinder, a booster piston reciprocable within the casing and in operable connection with the master cylinder piston, the booster piston forming a drain chamber, a control piston reciprocable within the bores of the casing and the booster piston and in operable connection with the push rod of the brake pedal, the control piston forming a pressure chamber, a passageway for leading operating fluid to flow toward the power control system through the booster, and a first and second valve means respectively for controlling communication between the pressure and drain chambers and between the pressure chamber and the passageway in response to actuation of the brake pedal, thereby to obtain desired braking force without disturbing operation of the power control system.

15 Claims, 3 Drawing Figures

INVENTOR
UICHIRO KOBASHI

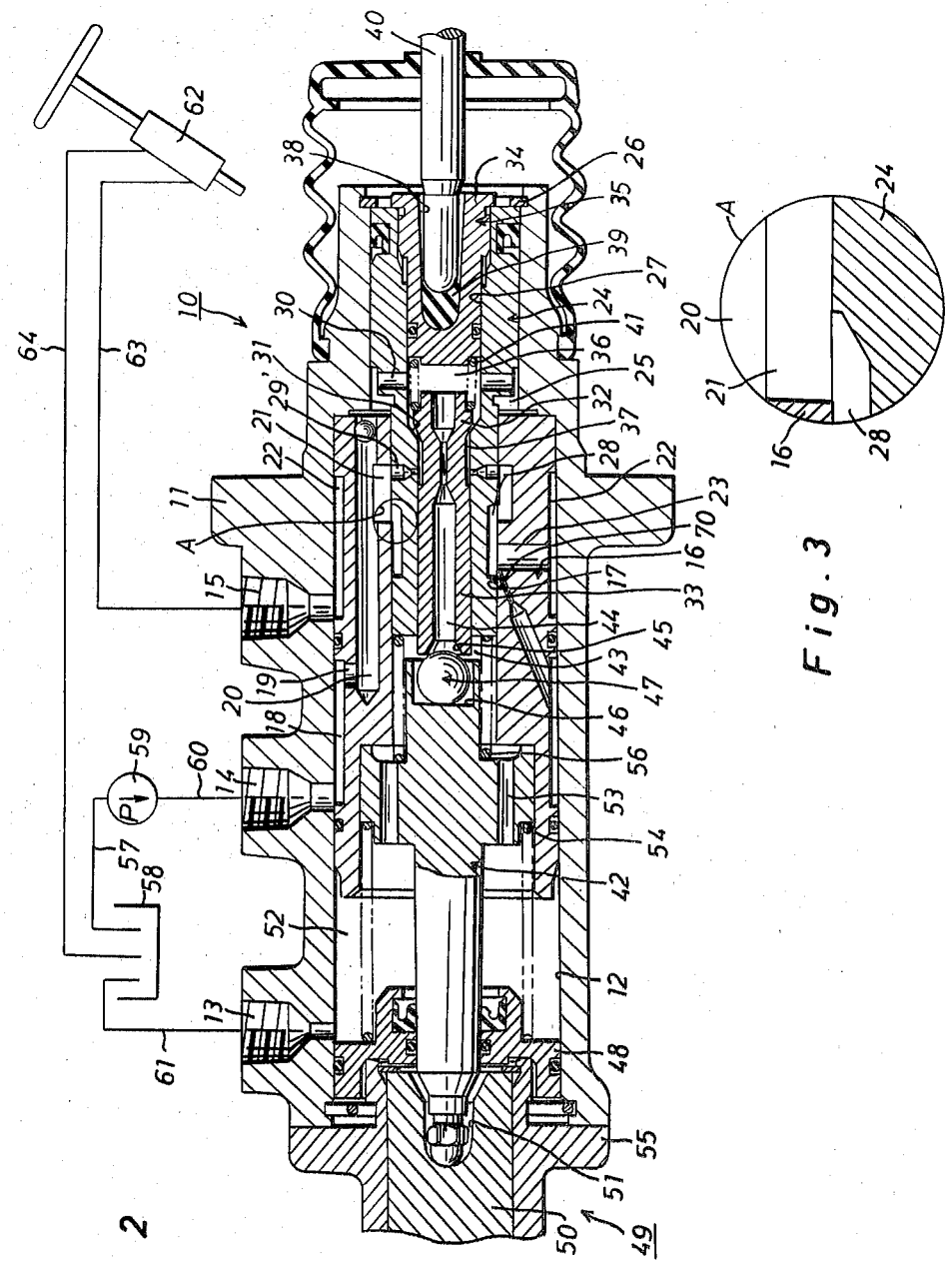

HYDRAULIC BRAKE BOOSTER

BACKGROUND OF THE INVENTION

The present invention relates to a hydraulic brake booster for a hydraulic brake system of a vehicle and more particularly to a hydraulic brake booster of a type utilizing a hydraulic pressure source for a power control system, such as a power steering control system, a hydraulic transmission control system, or the like.

SUMMARY OF THE INVENTION

The prime object of the present invention is to provide a hydraulic brake booster utilizing a hydraulic pump for a power control system, such as a power steering control system, wherein the booster can provide considerably larger operating force with the hydraulic brake system of a vehicle even while the power control system is under operation.

Another object of the present invention is to provide a hydraulic brake booster, having the above-mentioned features, wherein the booster can be operated by a small amount of operating fluid without disturbing the operation of the power control system.

Still another object of the present invention is to provide a hydraulic brake booster, having the above-mentioned characteristics, wherein the brake pedal stroke can vary in accordance with the force applied to the brake pedal so as to provide the driver with a comfortable feeling in operating the brake system of the vehicle.

It is still another object of the present invention to provide a hydraulic brake booster, having the above-mentioned characteristics, wherein the brake pedal stroke undergoes little change when the booster is operated while the power control system is operating at the same time. This provides the driver with safe operation of the brake system of the vehicle.

It is an important object of the present invention to provide a hydraulic brake booster, having the above-mentioned characteristics, wherein pulsation of operating fluid produced by pumping operation of a hydraulic pump as a pressure source can be eliminated to prevent the booster from having undesired vibration.

It is also another important object of the present invention to provide a hydraulic brake booster, having the above-mentioned characteristics, wherein axial thrusting force produced by the operating fluid within fluid passages of the booster for acting on a booster piston can be compensated so that no undesired vibration of the booster is produced.

It is a further object of the present invention to provide a hydraulic brake booster, having the above-mentioned characteristics, wherein sudden and rough operation of the brake pedal causes no trouble nor inconvenience in operation of the power control system.

A hydraulic brake booster constructed in accordance with the present invention, therefore, comprises a cylinder casing mounted on the brake master cylinder of the vehicle and connected with the pressure source of the hydraulic power control system to lead operating fluid toward the power control system therethrough; a booster piston reciprocable within the casing to form a drain chamber which communicates with the reservoir and is operably connected with the master cylinder piston; a control piston reciprocably engaged with the bores of the casing and the booster piston to form a pressure chamber operably connected with the push rod of the brake pedal; a first valve means for selectively opening and closing communication of the pressure chamber with the drain chamber; a passage way to lead the operating fluid flow toward the power control system through the booster, the passage way including flow regulating means therein for controlling the operating fluid flow in response to relative displacements of the booster piston and the control piston by means of depression of the brake pedal, and a second valve means for controlling communication between the pressure chamber and the passage way in response to the operation of the first valve means.

BRIEF DESCRIPTION OF THE DRAWINGS

The foregoing and various other objects, features and attendant advantages of the present invention will be more fully appreciated as the same becomes better understood from the following description especially when considered in conjunction with the accompanying drawings in which like reference numerals designate like or corresponding parts throughout the several views, and wherein:

FIG. 2 shows a side view of an elevational cross-section of a modified embodiment of the present invention;

FIG. 3 is an enlarged view of the circled portion of FIG. 2 designated by the letter A.

DESCRIPTION OF THE PREFERRED EMBODIMENTS

Figure 1:
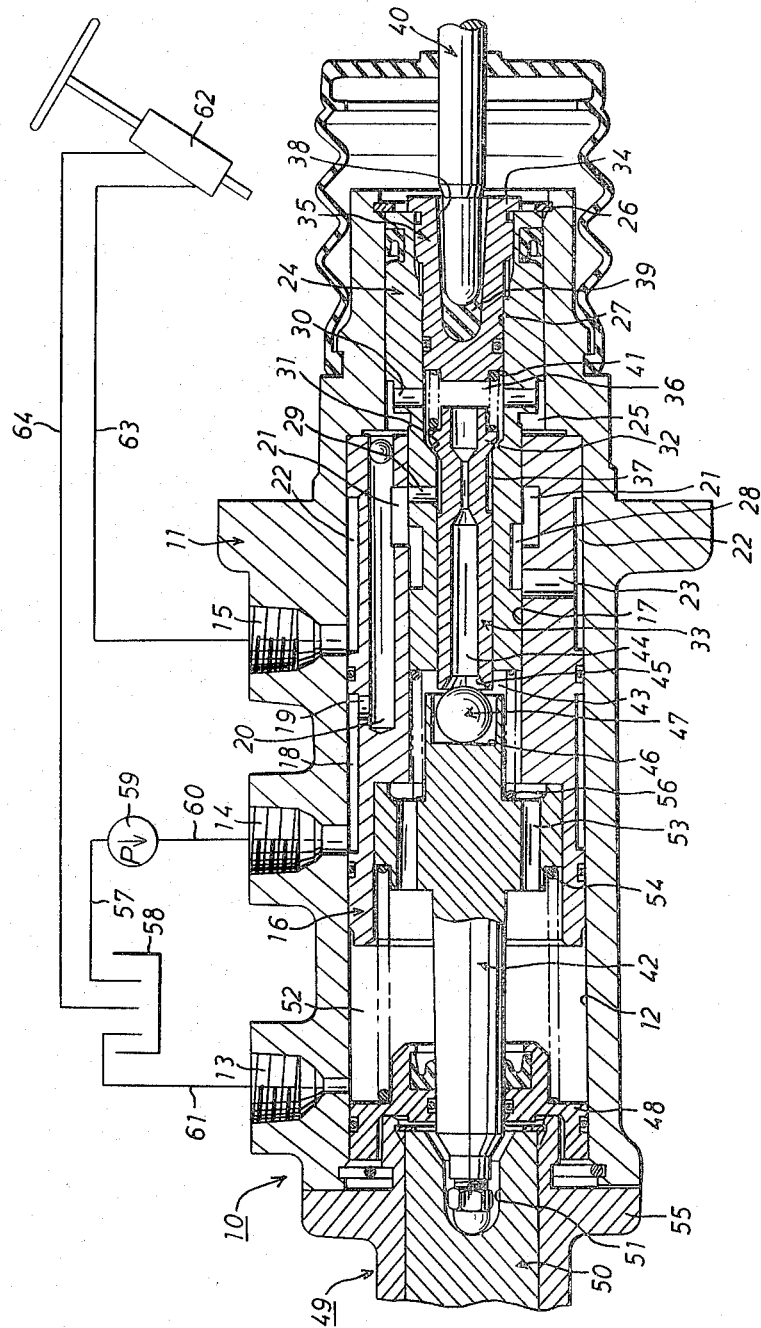
FIG. 1 shows a side view of an elevational cross-section of an embodiment of the present invention.

Now reference is made to FIG. 1, wherein there is shown the detailed construction of an embodiment of a hydraulic brake booster generally indicated with the reference numeral 10 hereinafter.

The hydraulic brake booster 10 is so positioned that pressurized fluid from a fluid pump 59 is delivered into the booster 10 through a conduit 60 and is further fed to a hydraulic power steering control system 62 through a conduit 63. The pressurized fluid is returned to a reservoir 58 through a conduit 64, the reservoir 58 being connected to the fluid pump 59 through a conduit 57. The hydraulic brake booster 10 is so designed that the pressurized fluid from the fluid pump 59 flows into the booster 10 through the conduit 60 and is returned back to the reservoir 58 through a conduit 61.

The hydraulic brake booster 10 comprises a housing 11 with a stepped cylindrical bore 12 drilled therein. The stepped cylindrical bore 12 has a smaller diameter at the right end portion than at the left end portion thereof.

The housing 11 includes at the upper wall thereof three ports that communicate with the larger diameter portion of the bore 12, such ports being an inlet port 14, a power steering port 15 and an outlet port 13. The inlet port 14 is connected through the conduit 60 to a discharge port of the fluid pump 59, while the power steering port 15 is connected through the conduit 63 to an inlet port of the power steering control system 62. The outlet port 13 is connected through the conduit 61 to the reservoir 58.

A booster piston 16 is reciprocably engaged within the stepped cylindrical bore 12 at the larger diameter portion thereof. Drilled within the booster piston 16 is a stepped cylindrical bore 17 which has a larger diameter at the left end than at the right end. Two annular grooves are provided on the outer circumferential wall of the booster piston 16, while another annular groove is drilled along the inner circumferential wall thereof.

A stepped piston 24 is reciprocable within the right smaller diameter portion of the cylindrical bore 12. The left portion of the piston 24 reciprocably extends into the cylindrical bore 17 and is provided with an annular groove on the outer circumferential wall thereof. The stepped piston 24 is held in place in the housing 11 by means of a retainer snap ring 26 which is firmly fixed to the housing 11. The piston 24 is further provided with a stepped cylindrical bore 27, the shoulder portion of which forms a valve seat 31.

Engaged slideably within the bore 27 is a poppet valve piston 33 which includes a fluid passage 44 of a spool shape therein and an annular groove drilled along the outer circumferential wall thereof. The valve piston 33 comprises at the right end portion thereof a valve 32 that performs a valving operation by seating on or disengaging the valve seat 31.

In the right portion of the bore 27, a bushing plug 35 is fixedly coupled. A push rod 40 connected to a brake pedal (not shown) is reciprocably engaged within a tapered bore 38 drilled in the bushing plug 35, the bore 38 having a resilient member 39 therein, made of such elastic material as rubber or the like, to prevent direct contact between the wall of the bore 38 and the rod 40. The bushing plug 35 is further provided with a flange 34 at the right end thereof, the diameter of the flange 34 being larger than that of the stepped cylindrical bore 27. A coiled spring 41 is stretched between the valve 32 and the bushing plug 35, normally biasing the valve piston 33 leftward.

A stepped rod 42 is reciprocably engaged within the left larger diameter portion of the stepped cylindrical bore 12. Provided at the right end portion of the rod 42 is a counter bore 46 drilled from the right end face of the rod 42. The counter bore 46 receives a ball 47 that performs a valving function by contacting or leaving valve seat 45 provided at the left end of the fluid passage 44 of the valve piston 33. The left smaller diameter portion of the stepped rod 42 extends through a divider 48 engageably into a counter bore 51 drilled within an impelling piston 50 of a well-known brake master cylinder 49. The divider 48 is firmly fixed to the left end portion of the stepped cylindrical bore 12 and in full contact with the right end face of a body 55 of the brake master cylinder 49 at the position shown in FIG. 1. A coiled spring 54 is stretched between the divider 48 and the stepped portion of the rod 42, normally biasing the rod 42 and the booster piston 16 rightward. Interposed between the stepped portion of the rod 42 and the piston 24 is a coiled spring 56 that normally biases the piston 24 rightward. The biasing force of the coiled spring 54, however, is preselected to be larger than that of the coiled spring 56.

Within the brake booster 10 thus constructed, an annular pressure chamber 25 is formed at the right side of the booster piston 16 by three surfaces of the cylindrical bore 12, the right end face of the booster piston 16 and the larger diameter portion of the stepped piston 24. Within the cylindrical bore 27 at the larger diameter portion thereof, a first fluid chamber 36 is formed by the bore 27, the valve piston 33 and the bushing plug 35.

A second fluid chamber 43 is provided within the stepped cylindrical bore 17 between the left end face of the piston 24 and the right end portion of the rod 42. At the left larger diameter portion of the cylindrical bore 12, a drain chamber 52 is formed by four surfaces of the bore 12, the left end face of the booster piston 16, the rod 42 and the right end face of the divider 48.

The circuit of the operating fluid comprises passages 18, 19, 20, 21, 28, 23 and 22, communicating with each other. The annular passages 18 and 22 are formed between the annular grooves on the outer circumferential wall of the piston 16 and the cylindrical bore 12. The annular passage 21 is grooved along the cylindrical bore 17 of the piston 16. The radial passage 19 is drilled within the piston 16 so as to communicate the passage 18 with the axial passage 20 provided within the piston 16. The radial passage 23 is drilled within the piston 16 to communicate the power steering port 15 with the annular passage 28 through the passage 22. The passage 28 is formed between the annular groove on the outer circumferential wall of the piston 24 and the cylindrical bore 17, connecting the passage 23 to the passage 21 of the piston 16. The passages 28 and 21 make a variable throttle by way of relative axial displacements. These passages 18, 19, 20, 21, 28, 23 and 22 provide communication of the inlet port 14 with the power steering port 15.

A fluid passage 29 is radially provided within the piston 24 and communicates the passage 21 with a fluid passage 37 which is formed between the annular groove on the valve piston 33 and the bore 27. A radial passage 30, is disposed within the piston 24 so as to communicate the annular pressure chamber 25 with the first fluid chamber 36.

Fluid passages 53 are axially provided through the stepped portion of the rod 42 to communicate the second fluid chamber 43 with the drain chamber 52 which normally is in open communication with the outlet port 13.

Novel operation of the brake booster in accordance with the present invention is described in detail hereinafter.

FIG. 1 shows a state wherein no actuation is applied on the brake pedal (not shown). Under this condition, the booster piston 16 and the rod 42 are held at the position shown in FIG. 1 by means of the biasing force of the coiled spring 54. The stepped piston 24 is also held at the position in FIG. 1 by the biasing force of the coiled spring 56.

Thus, the ball 47 is out of contact with the valve seat 45 while the valve 32 stays in contact with the valve seat 31. In this state, the annular pressure chamber 25 is in communication with the fluid reservoir 58 through the fluid passage 30, the first fluid chamber 36, the passage 44, the second fluid chamber 43, the passages 53, the drain chamber 52, the outlet port 13 and the conduit 61 respectively, in sequence. Consequently, hydraulic pressure in the pressure chamber 25 is equal to the atmospheric pressure.

On the other hand, the flow of hydraulic fluid from the reservoir 58 through the conduit 57 by operation of the fluid pump 59 is first delivered into the inlet port 14 through the conduit 60. The flow of fluid is further fed through the conduit 63 to the power steering control system 62, passing inside the brake booster 10 through the passages 18, 19, 20, 21, 28, 23, 22 and the power steering port 15 respectively in serial sequence.

The flow of fluid thence is returned back to the fluid reservoir 58 through the conduit 64 after operating the power steering control system 62.

In the event that the brake pedal is depressed, the actuation on the pedal is transmitted to the stepped piston 24 by means of the push rod 40, the resilient member 39 and the bushing plug 35. The piston 24 is thus pushed and shifted leftward against the biasing force of the coiled spring 56. The ball 47 contacts valve seat 45 of the valve piston 33 to close communication of the pressure chamber 25 with the second fluid chamber 43 and in turn with the fluid reservoir 58. At this moment, the variable throttle between the passages 21 and 28 acts to increase the pressure in the passage 21 and the valve 32 of the valve piston 33 is unseated from the valve seat 31.

The pressure chamber 25 then communicates with the fluid passage 21 through the fluid passage 30, the first fluid chamber 36, the passages 37 and 29 respectively in sequence.

In this case, provided that the power steering control system 62 is under operation, the fluid passage 21 naturally contains a certain hydraulic pressure that is necessary for operation of the power steering control system 62. Thus, the hydraulic pressure is supplied within the pressure chamber 25 only by communicating the chamber 25 with the fluid passage 21.

On the other hand, provided that the power steering control system 62 is not under operation, the stepped piston 24 is further thrusted leftward to cause throttling effect of the variable throttle formed by the fluid passage 21 and the fluid passage 28. As the throttling effect increases, higher hydraulic pressure is produced within the passage 21 to be supplied into the pressure chamber 25 through the passages 29 and 37.

When the pressure chamber 25 is thus filled with the pressurized hydraulic fluid, the booster piston 16 is urged leftward due to the pressure difference between the chamber 25 in which fluid is now highly pressurized and the drain chamber 52 in which fluid pressure is normally equal to the atmospheric pressure. Now, the booster piston 16 and the rod 42 are integrally pushed leftward to cause leftward movement of the push rod 50 of the brake master cylinder 49 so as to create a braking effect.

At the same time, the hydraulic pressure in the pressure chamber 25 also acts as a counter force on the bushing plug 35 and urges the push rod 40 rightward against the force exerted on the brake pedal (not shown) by the driver. The stepped piston 24, therefore, is pushed leftward to decrease intercommunication between the fluid passage 21 and the passage 28 until the hydraulic pressure in the pressure chamber 25 becomes equal to the actuation on the brake pedal for urging the push rod 40 rightward. Thus, the stroke of the brake pedal continuously corresponds to the actuating force on the brake pedal.

Throughout the series of operations of the hydraulic brake booster 10 as hereinabove discussed, the volume of hydraulic fluid supplied to the pressure chamber 25 and utilized therein is very low especially in comparison with the total volume of fluid discharged from the fluid pump 59. The operation of the power steering control system 62, therefore, is naturally not disturbed despite the operation of the hydraulic brake booster 10. When sudden and forceful depression of the brake pedal takes place, the passages 21 and 22 may be closed entirely because of over-stroke of the leftward movement of the piston 24. Instantly, however, this causes rapid increase of the fluid pressure within the pressure chamber 25 to urge the booster piston 16 leftward. Thus, the fluid pressure supply to the power steering control system 62 is maintained, with no problems in operation.

When the actuation on the brake pedal is released, the stepped piston 24, the bushing plug 35 and the push rod 40, at first, are pushed together rightward to the position as shown originally in FIG. 1, due to the biasing force of the coiled spring 56 as well as to the hydraulic pressure in the pressure chamber 25. The intercommunication between the fluid passage 21 and the passage 28 is now returned to the original state. Valve 32 then contacts valve seat 31 by the leftward biasing force of the coiled spring 41 so as to close communication of the pressure chamber 25 with the fluid passage 21. The ball 47, meanwhile, is unsealed from the valve seat 45 to communicate the pressure chamber 25 with the drain chamber 52 and thus with the reservoir 58 through the outlet port 13. This communication of the pressure chamber 25 with the fluid reservoir 58 equalizes the hydraulic pressure in the chamber 25 to the atmospheric pressure.

The booster piston 16 and the rod 42, therefore, are returned back rightward to their original positions as shown in FIG. 1 by means of the rightward biasing force of the coiled spring 54. The rightward movement of the piston 16 and the rod 42 further causes the fluid in the pressure chamber 25 to be returned back to the fluid reservoir 58.

As it has become clear through the description of the novel operation, the booster piston 16 is operated by the difference between the atmospheric pressure and the hydraulic pressure in the pressure chamber 25. Considerably bigger thrusting force can be produced on the booster piston 16, not only while the hydraulic power steering control system 62 is not under operation but also even while the same system is under operation.

The brake pedal stroke, in addition, can vary in accordance with the amount of the actuation given on the brake pedal, because the hydraulic pressure in the chamber 25 is controlled by the relative movement of the booster piston 16 with the stepped piston 24.

The driver, therefore, exercises a very comfortable feeling of operating the braking system through depression of the brake pedal. Furthermore, the driver feels little changes in the brake pedal stroke when the power steering control system is operated as well as the hydraulic brake booster 10. This provides the driver with comfortable performance of the steering control system and the brake control system.

Reference is made to FIG. 2 which shows a modified embodiment of the present invention. The general construction and operation of this modified embodiment are the same as those of the previous embodiment of FIG. 1 and similar reference numerals indicate similar parts. For the general construction and operation of this modified embodiment one should, therefore, refer to the detailed description of the previous embodiment with the following differences:

The radial fluid passage 29 in the previous embodiment is replaced with radial orifices 29' and an orifice 70 is additionally drilled within the booster piston 16 slanting at a certain angle against the axial line of the booster piston 16 so as to communicate the annular passage 18 continuously with the annular passage 28.

Operating fluid pressurized and discharged by the fluid pump 59 is inevitably accompanied by pulsation which usually acts against the braking effect and causes vibration in the booster 10.

In this embodiment the undesired pulsation of the operating fluid is eliminated by the functioning of the orifices 29' in delivering fluid to the annular pressure chamber 25 through the orifices 29'.

As the operating fluid passes through the variable throttle formed by the passages 21 and 28, axial thrusting force is produced within the passages 21 and 28 only to cause undesired vibration to the booster 10. This axial thrusting force is, however, offset by operating fluid delivered to the passage 28 through the orifice 70.

Furthermore, the continuous communication between the passages 18 and 28 by means of the orifice 70 assures a continuous supply of operating fluid to the power steering control system 62 under all conditions.

It should be clear that with this modified embodiment of the present invention, the possible undesired vibration of the booster can be eliminated and the driver can enjoy a better feeling in operating the brake pedal since no counter force is produced by the pulsation of the operating fluid acting on the brake pedal. Furthermore, the installation of the orifice 70 within the booster lessens the decrease in working efficiency of the operating fluid in comparison with the prior art wherein an orifice is provided adjacent the fluid pump.

In the preferred embodiments, the brake booster utilizes a hydraulic pressure source for a hydraulic power steering control system. It is, however, very obvious that the brake booster can use the hydraulic pressure source for such other hydraulic power control systems as a hydraulic transmission control system and the like.

Having now fully set forth both the structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An hydraulic brake booster for a vehicle having brake activating means, a pressure source, an hydraulic power control system, a reservoir, an hydraulic circuit for supplying hydraulic pressure fluid from said source to said power control system and returning the hydraulic pressure fluid from said power control system to said reservoir, and a brake master cylinder comprising: a cylinder for interposition within said circuit between said source and said power control system, said last-named cylinder being provided with a bore therein and with inlet means, outlet means and drain means respectively in communication with said source, said power control system and said reservoir; reciprocable means within said bore of said last-named cylinder for forming at one end thereof a drain chamber in communication with said drain means, said reciprocable means being operably connectible with said master cylinder and being provided with a bore therein; control means reciprocably engaged within both of said bores of said last-named cylinder and said reciprocable means to form a pressure chamber between the other end of said reciprocable means and said control means, said control means being operably connectible to the brake activating means of the vehicle and being provided with a bore therein; passage means for connecting said inlet means to said outlet means, said passage means including flow regulating means for controlling operating fluid flow within said passage means in response to relative displacements of said reciprocable means and said control means; a valve piston slidably engaged within said bore of said control means and being operably connectible through resilient means to the brake activating means; first valve means cooperating with said valve piston for selectively opening and closing communication between said pressure chamber and said drain chamber; and second valve means for controlling communication between said pressure chamber and said passage means through said flow regulating means in response to relative displacements of said control means and said valve piston, said first and second valve means being arranged radially inside said flow regulating means.

2. An hydraulic brake booster for a vehicle having brake activating means, a pressure source, an hydraulic power control system, a reservoir, an hydraulic circuit for applying hydraulic pressure fluid from said source to said power control system and returning the hydraulic pressure fluid from said power control system to said reservoir, and a brake master cylinder comprising: a cylinder for interposition within said circuit between said source and said power control system, said last-named cylinder being provided with a bore which has an inlet port, an outlet port and a drain port respectively for communication with said source, said power control system and said reservoir; a booster piston reciprocable within the bore of said last-named cylinder and forming at one end thereof a drain chamber in communication with said drain port, said booster piston being operably connectible with said master cylinder and being provided with a bore therein, a stepped piston reciprocably engaged within both of said bores of said last-named cylinder and said booster piston to form a pressure chamber between the other end of said booster piston and said stepped piston, said stepped piston being operably connectible to the brake activating means of the vehicle and being provided with a bore therein; passage means extending in said last-named cylinder, said booster piston and said stepped piston for connecting said inlet port to said outlet port, said passage means including flow regulating means formed by relatively slidable duct openings in said booster piston and said stepped piston for controlling operating fluid flow within said passage means in response to relative displacements of the booster and stepped pistons; a valve piston having an axial bore slidably engaged within said bore of said stepped piston and being operably connectible through resilient means to said brake activating means; a first valve means cooperating with a seat at one end of said valve piston for selectively opening and closing communication between said pressure chamber and said drain chamber; and a second valve means including a valve element at the other end of said valve piston for seating against a seat on said stepped piston for controlling communication between said pressure chamber and said passage means through said flow regulating means in response to relative displacements of said stepped piston and said valve piston, said first and second valve means being disposed radially inwardly of said flow regulating means.

3. A hydraulic brake booster as claimed in claim 2, wherein said cylinder is mounted on said brake master cylinder.

4. A hydraulic brake booster as claimed in claim 2, wherein resilient means is disposed within said drain chamber between one end wall of said last-named cylinder and one end of said booster piston so as to normally bias said booster piston in a predetermined position.

5. A hydraulic brake booster as claimed in claim 4, wherein said resilient means is a coiled compression spring.

6. An hydraulic brake booster as claimed in claim 2, wherein said first valve means includes a ball valve substantially centered with and cooperating with said axial bore formed in said valve piston to connect said pressure chamber with said drain chamber, and said second valve means includes a spring normally biasing said valve element toward said valve seat on the stepped piston.

7. An hydraulic brake booster as claimed in claim 2, wherein said inlet port is positioned between said outlet port and said drain port.

8. An hydraulic brake booster as claimed in claim 2, wherein said booster piston and a piston of said master cylinder are connected to each other by a connecting rod and further including resilient means interposed between said stepped piston and said connecting rod to normally bias said stepped piston toward the brake activating means.

9. A hydraulic brake booster as claimed in claim 8, wherein said resilient means is a coiled compression spring.

10. An hydraulic brake booster as claimed in claim 2, wherein said bore of the last-named cylinder is a stepped bore, the smaller diameter portion of said stepped piston engaging that portion of the bore of said booster piston which is positioned in the larger diameter portion of said stepped bore and the larger diameter portion of said stepped piston engaging the smaller diameter portion of said stepped bore of the last-named cylinder, said pressure chamber being formed between a shoulder portion of said stepped piston and said booster piston.

11. An hydraulic brake booster as claimed in claim 2, wherein said passage means comprises a first passage connecting said inlet port with the bore of said booster piston and a second passage connecting said bore of said booster piston with said outlet port.

12. A hydraulic brake booster as claimed in claim 11, wherein said flow regulating means is formed between said first and second passages by a pair of annular grooves respectively formed on the bore wall of said booster piston and on the outer wall of said stepped piston.

13. An hydraulic brake booster as claimed in claim 11, wherein said passage means includes a third passage connecting said first passage with said pressure chamber, said second valve means being formed within said third passage.

14. A hydraulic brake booster as claimed in claim 13, wherein said third passage includes an orifice therein.

15. A hydraulic brake booster as claimed in claim 13, wherein said first passage and second passage are connected to each other by way of a bypass passage including an orifice therein.

* * * * *